Oct. 28, 1969       Y. J. TALBOT       3,474,998
OUTSIDE REARVIEW MIRROR ASSEMBLY FOR AUTOMOTIVE
            VEHICLES AND THE LIKE
              Filed March 1, 1966
FIG.1
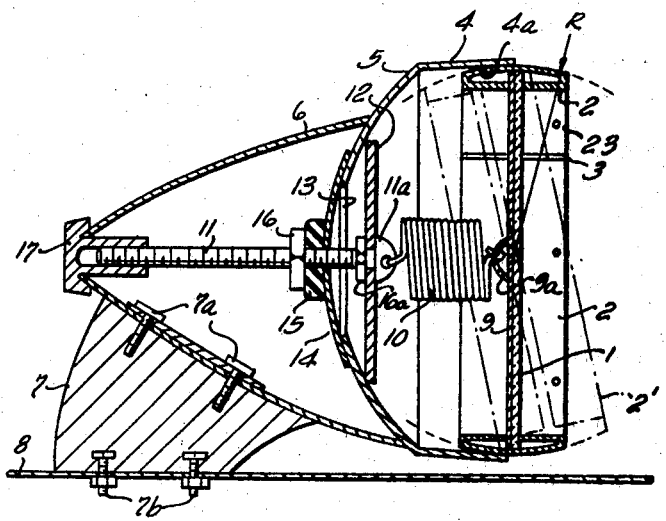
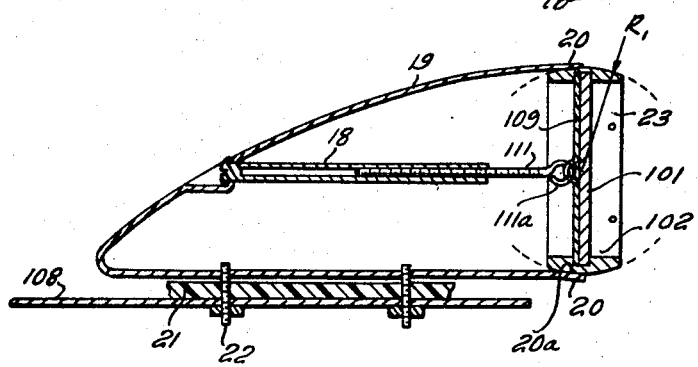
FIG.2
FIG.3
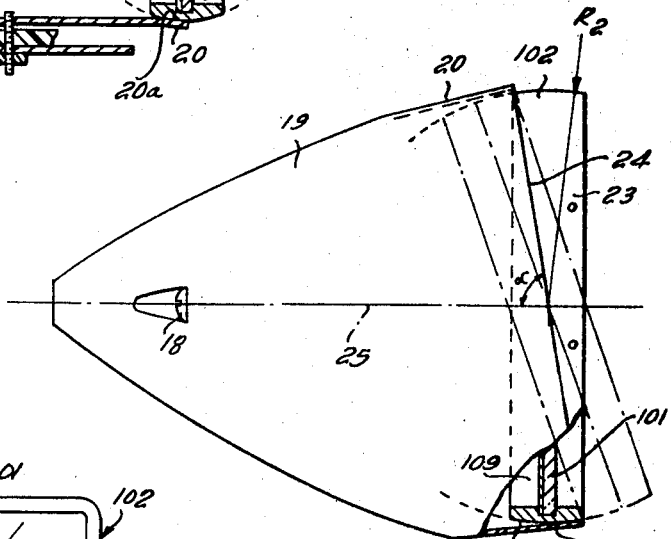
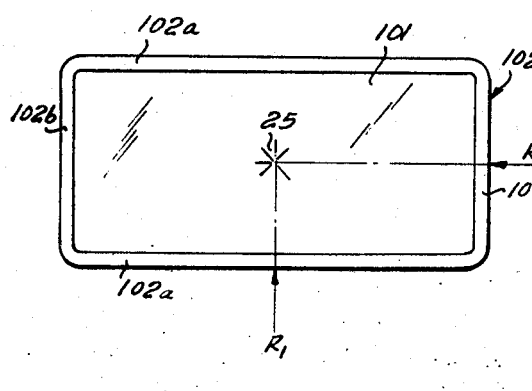
FIG.4
INVENTOR.
YORCK J. TALBOT
BY
Michael J. Striker
his ATTORNEY

United States Patent Office 3,474,998
Patented Oct. 28, 1969

3,474,998
OUTSIDE REARVIEW MIRROR ASSEMBLY FOR AUTOMOTIVE VEHICLES AND THE LIKE
Yorck Joachim Talbot, 80 Ebersstrasse, Berlin, Germany
Filed Mar. 1, 1966, Ser. No. 530,867
Claims priority, application Germany, Mar. 5, 1965, T 28,102
Int. Cl. A47g *1/16;* B60v *1/06*
U.S. Cl. 248—483    20 Claims

ABSTRACT OF THE DISCLOSURE

An outside rearview mirror assembly has a housing whose rear portion is provided with an opening in which an annular frame is tiltably received. The frame has a convex external surface which includes pairs of surface portions located diametrically opposite each other and having respective radii of curvature whose length corresponds to substantially half the distance between the respective pair of surface portions. A rearview mirror is mounted in the frame.

---

The present invention relates to improvements in outside rearview mirror assemblies for use on automotive vehicles, bicycles and the like. More particularly, the invention relates to improvements in the mounting of mirrors in such assemblies with a view to insure convenient, rapid and accurate adjustments to and from an infinite number of positions.

It is an important object of the present invention to provide a rearview mirror assembly wherein the mirror may be adjusted to an infinite number of positions and wherein such adjustments necessitate the exertion of a small effort.

Another object of the invention is to provide an assembly of the just outlined characteristics wherein the mirror may be of circular, oval or polygonal shape.

A further object of the instant invention is to provide a novel frame for the mirror of an outside rearview mirror assembly.

An additional object of the invention is to provide an assembly wherein adjustments of the mirror cannot result in scratching of its frame and/or in penetration of dirt, moisture or other foreign matter into the interior of the housing.

A concomitant object of the invention is to provide an outside rearview mirror assembly wherein a large area of the reflecting mirror surface remains visible in all positions of the mirror.

A further object of the invention is to provide a rearview mirror assembly which can be readily installed on all types of automotive and other vehicles and whose mirror can be moved to an infinite number of positions despite the fact that such mirror need not be of circular shape.

Briefly stated, one feature of my present invention resides in the provision of an outside rearview mirror assembly for automotive vehicles or the like which comprises a housing having a rear portion or socket provided with an opening, an elastically deformable or rigid foot for connecting the housing, for example, to the body of an automotive vehicle, an annular mirror frame tiltably received in the opening defined by the rear portion of the housing and having a convex external surface which includes pairs of surface portions located diametrically opposite each other and having radii of curvature whose length is less than the distance between the respective pair of surface portions, and a mirror mounted in the frame so that its reflecting surface faces rearwardly.

If the opening is of circular outline, the radii of curvature of all surface portions are the same and the centers of curvature of such surface portions are located on the axis of the opening, i.e., each radius of curvature then equals half the diameter of the opening in the rear portion of the housing.

The frame may resemble a rectangle and may be tiltably received in a similar rectangular opening of the housing. The radii of curvature of the external surfaces of the shorter sides of the frame then equal half the distance between such shorter sides, and the same holds true for the radii of curvature of external surfaces along the longer sides of the frame.

The frame may be mounted directly in the open base of a one-piece streamlined housing or the housing may comprise a substantially conical front portion whose base is open to accommodate the rear portion in such a way that the latter is tiltable in a manner as known from spherical or universal joints.

The novel features which are considered as characteristic of the invention are set forth in particular in the appended claims. The improved rearview mirror assembly itself, however, both as to its construction and its mode of operation, together with additional features and advantages thereof, will be best understood upon perusal of the following detailed description of certain specific embodiments with reference to the accompanying drawings, in which:

FIG. 1 is a longitudinal central section through an outside rearview mirror assembly which embodies one form of the present invention and wherein the rear portion of the housing is tiltable in the front portion, the mirror used in the assembly of FIG. 1 being of circular outline;

FIG. 2 is a similar longitudinal central section through a modified rearview mirror assembly which comprises a one-piece housing and a mirror of rectangular outline;

FIG. 3 is a side elevational view of the modified assembly with a portion of the housing and frame broken away; and FIG. 4 is a rear elevational view of the frame for the mirror in the assembly of FIGS. 2 and 3.

Referring first to FIG. 1, there is shown an outside rearview mirror assembly which comprises a two-piece or composite housing including a streamlined hollow front portion 6 of substantially conical shape which tapers forwardly, and a rear portion 5 which resembles a hollow calotte and has a slightly conical rear part or socket 4 defining an opening 4a of circular outline. A round plate-like mirror 1 is mounted in a specially configurated frame 2 which resembles an annulus and more particularly a split ring having an axially extending slot 3. The external surface of the frame 2 has a radius of curvature R whose length equals the radius (half diameter) of the opening 4a. Due to such configuration of the external surface on the frame 2, the latter is tiltable in the conical socket 4 in all directions so as to permit accurate adjustments of the plane of the mirror 1 with a view to insure that the driver of the vehicle has a satisfactory field of view.

The external surface at the forward end of the rear portion 5 is of spherical shape and this rear portion 5 is tiltable in the open base of the front portion 6. The front portion 6 is connected to a rigid foot 7 (see the screws 7a) and this foot is fixed to the body 8 of an automotive vehicle, for example, to the door adjacent to the driver's seat. The connection between the foot 7 and body 8 may comprise a set of screws 7b or similar fasteners.

The frame 2 further accommodates a disk-shaped backup member 9 of sheet metal which is located directly in front of the mirror 1 and is provided with an eye 9a or a similar retainer for a hook at the rear end of a helical contraction spring 10 forming part of a yieldable coupling between the frame 2 and the housing 5, 6. The spring 10 comprises a second hook which is attached to the head 11a at the rear end of an elongated coupling bolt 11 whose front end meshes with a hollow retaining nut 17 recessed into the tip of the front portion 6. The head 11a of the bolt 11 is rigidly connected with a circular centering disk 12 which bears against the concave internal surface of the rear portion 5 and an intermediate portion of the bolt 11 extends with considerable clearance through a centrally located cutout 13 of the rear portion 5. A resilient washer 15 bears against the outer side of a concavo-convex cap 14 which overlies the cutout 13, and the bolt 11 meshes with a lock nut 16 which bears against the washer 15 and urges the centering disk 12 against the internal surface of the rear portion 5. The washer 15 insures that the parts 12, 14 bear against the rear portion 5 so that a person wishing to adjust the angular position of the rear portion with reference to the conical front portion 6 must overcome a certain friction.

The above-described construction of the outside rearview mirror assembly allows for an infinite number of adjustments in the angular position of the mirror 1 with reference to the vehicle body 8 and with reference to the front housing portion 6. This is due to the fact that the rear housing portion 5 is adjustable with reference to the front portion 6 and that the frame 2 with the mirror 1 is adjustable with reference to the rear portion 5. The two adjustments may be carried out in such a way that the point about which the frame 2 is tilted may but need not coincide with the point about which the operator can tilt the rear housing portion 5. In the assembly of FIG. 1, the point around which the frame 2 can be tilted with reference to the rear housing portion 5 is located substantially on the axis of the opening 4a and substantially in the central plane of the mirror 1. An important advantage of such selection of the point about which the frame 2 is tiltable with reference to the rear housing portion 5 (i.e., that the point is located in the central plane of the mirror 1) is seen to reside in that, even when tilted through a maximum angle (for example, to and beyond the phantom-line position 2' of FIG. 1), the frame 2 does not extend too far beyond the socket 4. Also, the shield-like trailing part of the frame 2 (which extends rearwardly and beyond the reflecting surface of the mirror 1) does not conceal too much of the reflecting surface so that the driver of the vehicle can still see a large portion of the road behind his own car. In other words, the driver can observe a relatively large portion of the reflecting surface regardless of the momentarily selected position of inclination of the frame 2. It is to be noted that the rear half of the frame 2 may resemble a hollow cone and may flare rearwardly and outwardly away from the reflecting surface of the mirror 1.

The improved assembly may be provided with means for facilitating adjustments of the frame 2 with reference to the rear housing portion 5. Such means may comprise a suitably bent adjusting tool (not shown) which can be introduced into one of several recesses or depressions 23 provided in the internal surface of the frame 2 rearwardly of the mirror 1. The aforementioned adjusting tool must overcome friction generated by the spring 10 which tends to move the frame 2 deeper into the socket 4. Furthermore, the adjusting tool allows for more accurate adjustments than if the adjustment were made by hand. The number of recesses 23 may be selected at will, e.g., the internal surface of the frame 2 may be formed with an annulus of equidistant recesses. The adjusting tool may resemble an L-shaped body made of strong wire or the like.

The assembly of FIG. 1 may be modified in a number of ways without departing from the spirit of my invention. For example, in order to reduce the manufacturing and assembling costs, the spring 10, the centering disk 12 and the nut 16a (which presses the disk 12 against the head 11a) may be omitted if the head 11a is coupled directly to the eye 9a of the backup member 9 in such a way that the head 11a and eye 9a form a universal joint which allows for swiveling or tilting of the frame 2 in all directions. Also, the elastic washer 15 may be replaced by a helical or dished spring which must be strong enough to urge the parts 12 and 14 against the opposite sides of the rear housing portion 5.

In order to insure that the external surface of the frame 2 is not scratched in response to repeated adjustments with reference to the rear part 4 of the housing portion 5, the internal surface of the rear part 4 is preferably finished to a high degree of smoothness or the surface surrounding the opening 4a may taper slightly in a direction toward the open rear end of the portion 5. The housing 5, 6 is preferably coated with chromium or with another eye-pleasing material. Similar coating may be provided on the external surface of the frame 2. Alternatively, the frame 2 may be made of synthetic plastic material and its external surface may be coated with a shiny layer resembling chromium by resorting to a spraying, galvanizing or other suitable process.

FIGS. 2 and 3 illustrate a modified outside rearview mirror assembly which comprises a one-piece streamlined housing 19 having a rear part or socket 20 which defines a rectangular opening 20a. The mirror 101 is of rectangular shape and is received in an annular frame 102 of rectangular profile. The backup member 109 for the mirror 101 is fixedly mounted in the frame 102 and is articulately connected to the head 111a of an elongated coupling bolt 111. The front portion of this bolt 111 meshes with an elongated sleeve-like nut 18 which is recessed into the housing 19. The connection between the housing 19 and the automobile body 108 comprises a block-shaped foot 21 which preferably consists of elastomeric material and is traversed by screws 22 or analogous fasteners. The foot 21 is relatively high but narrow and its relatively large lower face (as viewed in FIG. 2) may be of such outline that it can straddle a sharp ridge, a rib, a corrugation, a groove or another protuberance or depression in the exposed surface of the body 108 whereby the foot is automatically shifted to optimum position when the screws 22 are driven home. The material of the foot 21 is not too soft but is sufficiently elastic to conform to the outline of the body 108. On the other hand, the mass of the foot 21 suffices to insure that the housing 19 does not vibrate when the vehicle is in motion. If it consists of elastomeric material, the foot 21 can be made of medium soft rubber or plastic.

The rear part or socket 20 of the housing 19 flares slightly rearwardly and outwardly. FIGS. 3 and 4 show that the frame 102 resembles an elongated rectangle with two longer portions or sides 102a and two shorter sides 102b. The external surfaces of the sides 102a have radii of curvature R1 and the external surfaces of the sides 102b have radii of curvature R2. The length of these radii respectively equals half the distance between the external surfaces of the sides 102a 102b or half the minimum and maximum transverse dimension of the opening 20a. The external surfaces having radii of curvature R1 and R2 are respectively located diametrically opposite each other, and FIG. 4 shows that their centers of curvature are located on a line 25 passing through the center of the opening 20a. This line 25 (see also FIG. 3) can be said to coincide with the axis of the housing 19 and is parallel with the direction of forward movement of the vehicle. The frame 102 may be produced in the form of a one-piece body or as a slotted annulus which may or may not be closed after the mirror 101 and backup member 109 are properly mounted therein. The slot may be formed in the frame 102 prior to insertion of the parts 101, 109 and this frame may be made of metallic or synthetic plastic material.

FIG. 3 shows that the rear end face 24 of the rear part 20 makes with the center line 25 a relatively large acute angle alpha, i.e., that the housing 19 is cut off at a slant so as to afford a better view to the driver if the assembly is mounted on or adjacent to the driver's door. The point about which the frame 102 may be tilted is located substantially at the junction of the head 111a with the backup member 109, i.e., again close to the central plane of the mirror 101. The assembly of FIGS. 2 to 4 is intended to be used at the left-hand side of the body 108. An assembly which is used at the right-hand side of the body 108 must be mirror symmetrical to the illustrated assembly, i.e., the inclination of the rear end face 24 will be in the opposite direction. The ring 102 is tiltable up and down about the centers of curvature of the exposed surface portions on the sides 102a, and outwardly or inwardly, about the centers of curvature of the exposed surfaces on the sides 102b.

The magnitude of the maximum angle through which the frame 2 or 102 may be tilted from its normal central or neutral position depends on the width of this frame. A relatively narrow frame (as seen in the direction at right angles to the plane of the mirror 1 or 101) will allow for smaller angular adjustments than a wide frame. As a rule, the width of the frame 2 or 102 will be selected after the manufacturer has decided on the desired maximum angle of adjustment with reference to the housing 5, 6 or 19. Such maximum adjustment should not result in complete withdrawal of any portion of the frame 2 or 102 from the respective housing because such excessive tilting of the frame would produce a gap for entry of dust, moisture and other foreign matter. Also, a frame which is allowed to tilt excessively is not sufficiently supported by the housing.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is:

1. An outside rearview mirror assembly, particularly for use on automotive vehicles, comprising a housing having a rear portion with an edge portion forming an opening; a frame fitting into and tiltably received in said opening, said frame having a front side and a rear side and having a convex external surface including pairs of convex surface portions located diametrically opposite each other, said surface portions having radii of curvature whose length corresponds to substantially half the distance between the respective pair of surface portions, the center of said radii of curvature being located within said frame spaced inwardly from the said front and rear sides thereof so that said surface portions slide along the inner surface of said edge portion of said housing during tilting of said frame; and a rearview mirror mounted in said frame.

2. An assembly as set forth in claim 1, wherein said opening is of circular outline and said frame resembles a ring whose external surface has a center of curvature located on the axis of said opening.

3. An assembly as set forth in claim 1, wherein said opening resembles a rectangle, said external surface having two pairs of surface portions each having its center of curvature located on a line passing through the center of said rectangle.

4. An assembly as set forth in claim 1, wherein said housing further comprises a streamlined front portion with an open base, said rear portion being tiltably received in said open base and further comprising coupling means connecting said rear portion with said front portion and with said frame.

5. An assembly as set forth in claim 1, further comprising yieldable coupling means connecting said frame with said housing.

6. An assembly as set forth in claim 1, wherein said mirror is a plate and said frame is tiltable about a central point which is located at least close to the plane of said mirror.

7. An assembly as set forth in claim 1, wherein said frame has an axially extending slot to facilitate insertion of said mirror.

8. An assembly as set forth in claim 1, wherein the edge portion of said housing has a rear end face which makes an acute angle with the axis of said housing.

9. An assembly as set forth in claim 1, further comprising coupling means connecting said housing with said frame and including a backup member for said mirror mounted in said frame, an elongated coupling bolt anchored in said housing and having an end adjacent to said backup member, and an articulate connection between the end of said bolt and said backup member.

10. An assembly as set forth in claim 1, wherein said external surface has less than three different radii of curvature.

11. An assembly as set forth in claim 1, wherein said edge portion has an internal surface which surrounds said opening and tapers outwardly and rearwardly, and further comprising coupling means tiltably connecting said frame with said housing.

12. An assembly as set forth in claim 11, wherein said coupling means comprises resilient means arranged to bias said external surface against said internal surface so that said frame remains in selected position of adjustment with reference to said housing.

13. An assembly as set forth in claim 1, further comprising a foot for said housing and fastener means securing said foot to the body of a vehicle.

14. An assembly as set forth in claim 13, wherein said foot consists of elastomeric material.

15. An assembly as set forth in claim 13, wherein said housing has an axis which is substantially parallel with the direction of movement of the vehicle.

16. An assembly as set forth in claim 1, wherein said frame is provided with means engageable by a tool to facilitate tilting of such frame to a selected position of inclination with reference to said housing.

17. An assembly as set forth in claim 16, wherein said frame has a portion extending rearwardly of and forming a shield around the reflecting surface of said mirror, said means including at least one recess provided in the inner side of said shield.

18. An assembly as set forth in claim 1, wherein said housing further comprises a front portion having an open rear end tiltably receiving said rear portion and coupling means connecting said rear portion with said frame and with said front portion, said coupling means comprising a backup member mounted in said frame forwardly of said mirror, a contraction spring connected with said backup member, a coupling bolt having one end anchored in said front portion and another end adjacent to said open end and connected with said spring, and means connecting an intermediate portion of said bolt with said rear portion so that said rear portion is movable angularly with reference to said bolt.

19. An assembly as set forth in claim 18, wherein said connecting means comprises a centering member received in said rear portion, a cap received in said front portion adjacent to said rear portion, and means carried by said bolt for biasing said centering member and said cap against said rear portion.

20. An assembly as set forth in claim 18, wherein said rear portion is of concavo-convex shape and extends into the open end of said front portion, said rear portion further having a cutout receiving with clearance an intermediate portion of said bolt.

References Cited

UNITED STATES PATENTS 2,878,726  3/1959  Tuthill _____ 248—481

FOREIGN PATENTS 1,378,991  10/1964  France.
915,538  7/1954  Germany.
871,881  7/1961  Great Britain.

ROY D. FRAZIER, Primary Examiner.
FRANK DOMOTOR, Assistant Examiner.

U.S. Cl. X.R.

248—481, 484